(12) United States Patent  
Yoshizawa

(10) Patent No.: US 7,057,780 B2  
(45) Date of Patent: Jun. 6, 2006

(54) OPTICAL SCANNING DEVICE AND IMAGE FORMING APPARATUS USING THE SAME

(75) Inventor: Hiroshi Yoshizawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/247,644

(22) Filed: Sep. 20, 2002

(65) Prior Publication Data

US 2003/0058513 A1    Mar. 27, 2003

(30) Foreign Application Priority Data

Sep. 21, 2001    (JP)    ............................. 2001-288474

(51) Int. Cl.  
   *G02B 26/08* (2006.01)
(52) U.S. Cl. .................. 359/204; 359/216; 347/243
(58) Field of Classification Search ........ 359/201–204, 359/216–219; 347/233, 235, 243  
   See application file for complete search history.

(56) References Cited

U.S. PATENT DOCUMENTS 3,646,568 A * 2/1972 Woywood .................. 347/239
4,537,465 A * 8/1985 Sherman et al. ............ 359/216
5,751,462 A * 5/1998 Shiraishi et al. ............ 359/204

FOREIGN PATENT DOCUMENTS

| JP | 9-43524 | 2/1997 |
|---|---|---|
| JP | 10-307269 | 11/1998 |
| JP | 11-95141 | 4/1999 |
| JP | 11-142771 | 5/1999 |
| JP | 2000-147397 | 5/2000 |
| JP | 2000-280523 | 10/2000 |
| JP | 2001-108923 | 4/2001 |

* cited by examiner

*Primary Examiner*—James Phan  
(74) *Attorney, Agent, or Firm*—Oblon, Spivak, McClelland, Maier & Neustadt, P.C.

(57) ABSTRACT

An optical scanning device of the present invention includes a plurality of light source units each including two semiconductor lasers and two coupling lenses respectively associated with the lasers. A single rotatable deflector is implemented as two polygonal mirrors coaxially stacked on each other and different in angular phase from each other. The deflector deflects laser beams issuing from the light source units for thereby scanning a plurality of photoconductive drums via conventional optical devices. A synchronization sensor is shared by the laser beams, but can easily output synchronizing signals clearly separate from each other.

7 Claims, 12 Drawing Sheets

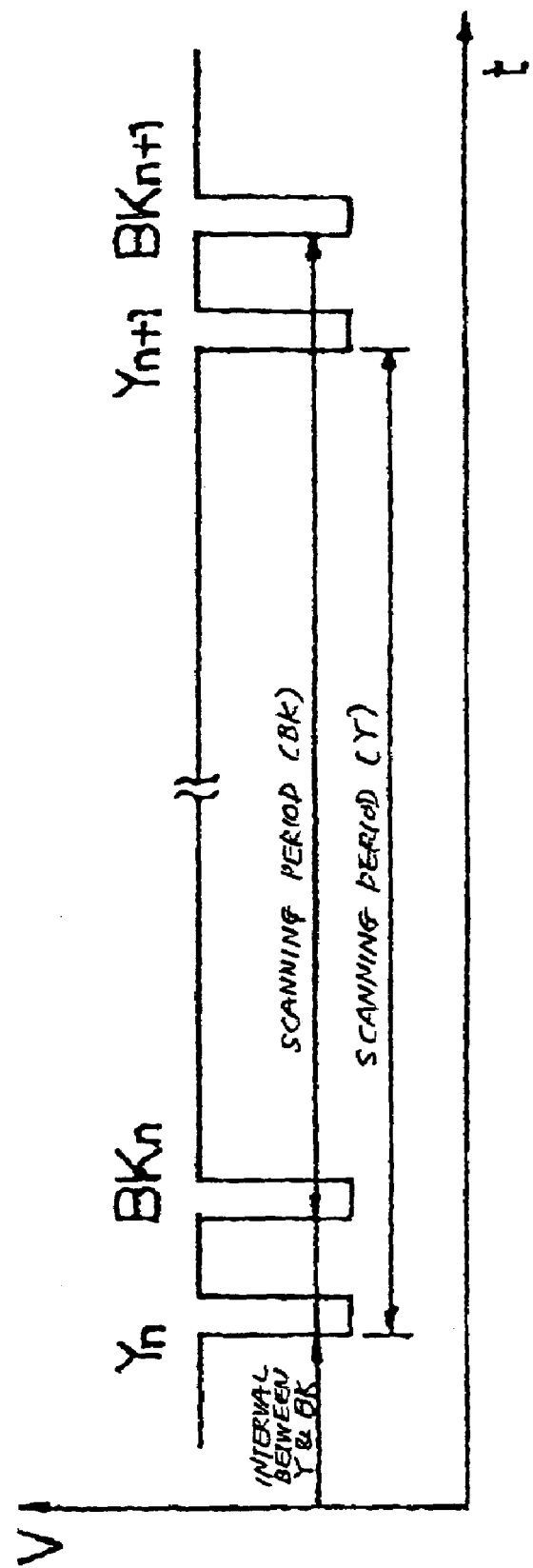

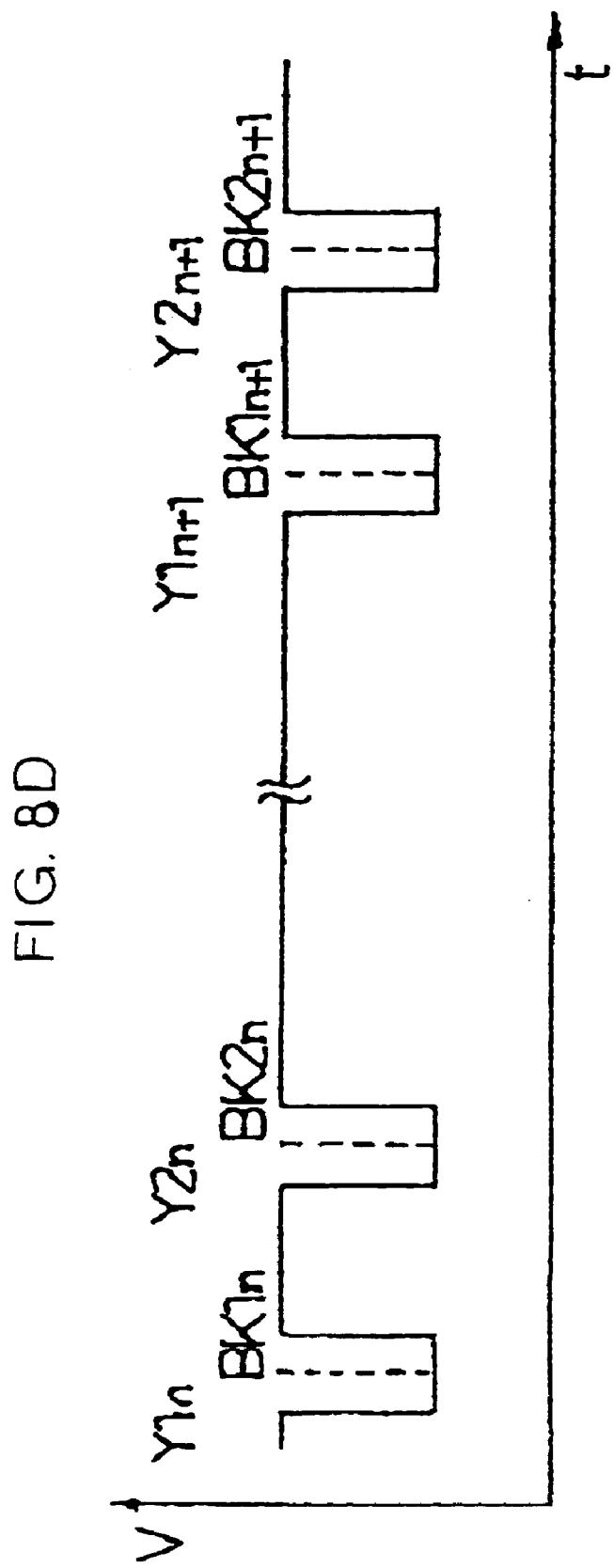

OPTICAL SCANNING DEVICE AND IMAGE FORMING APPARATUS USING THE SAME

BACKGROUND OF THE INVENTION

1. Field of the Invention

The present invention relates to an optical scanning of the type scanning a plurality of image carriers with a plurality of laser beams issuing from a plurality of light sources, and a printer, copier, facsimile apparatus or similar image forming apparatus using the same.

2. Description of the Background Art

A recent achievement in the imaging art is a color laser printer or similar image forming apparatus using a plurality of laser beams for scanning a plurality of image carriers or photoconductive elements. In this type of image forming apparatus, each laser beam issuing from a particular light source is focused on one of the image carriers to form a latent image. The latent image is developed by a developer of particular color to thereby produce a corresponding toner image. Such toner images of different colors are sequentially transferred to a single sheet or recording medium one above the other, completing a full-color image. A problem with this type of image forming apparatus is that a plurality of scanning means necessary for dealing with the laser beams increase the number of parts and obstruct the free layout of parts and therefore make the apparatus bulky, compared to a monochromatic image forming apparatus.

To meet the increasing demand for a color laser printer as small as and as productive as a monochromatic laser printer, there has recently been implemented a tandem image forming apparatus including a plurality of optics arranged in a single housing and a plurality of image carriers arranged side by side. Each optics includes a light source for emitting a laser beam for scanning a particular image carrier. An optical scanning device included in this type of image forming apparatus includes a rotatable deflector made up of two polygonal mirrors stacked on each other. However, because the two polygonal mirrors have the same angular phase, lights propagated through two optical paths are incident to a single synchronization sensor at the same time, making it difficult to produce synchronizing signals independent of each other, as will be described more specifically later.

Another problem with the above scanning device is that the synchronization image height of the individual laser beam is not always constant. It is therefore necessary to provide a difference between image heights great enough to insure the separation of the resulting synchronizing signals. Such a difference, however, is not practicable without increasing the effective scanning range and therefore the sizes of lenses and other optical devices. Large-size optical devices make the scanning device and therefore the entire image forming apparatus bulky while increasing production cost.

To further enhance the productivity of the image forming apparatus using the above scanning device, the deflector must be rotated at high speed, e.g., about 30,000 rpm (revolutions per minute). This, however, makes the separation of synchronizing signals more difficult and reduces the service life of a motor used to drive the deflector while aggravating noise during operation.

Technologies relating to the present invention are disclosed in, e.g., Japanese Patent Laid-Open Publication Nos. 11-142771, 2000-280523 and 2001-108923.

SUMMARY OF THE INVENTION

It is an object of the present invention to provide a small-size, low-cost optical scanning device capable of insuring stable separation of synchronizing signals and desirable image formation without needling long optical devices, and an image forming apparatus using the same.

An optical scanning device of the present invention includes a plurality of light sources configured to emit a laser beam each, a deflector for deflecting laser beams issuing from the light sources in the main scanning direction, and a sensor for sensing the laser beams deflected by the deflector on a main scanning line. The sensor is shared by the laser beams. One of the light sources expected to emit at least one of the laser beams sharing the sensor has a plurality of light-emitting devices arranged to scan a desired surface at a preselected distance from each other in the main scanning direction.

Another optical scanning device of the present invention includes a plurality of light source units configured to emit a respective laser beam each, a deflector for deflecting laser beams issuing from the light source units in the main scanning direction, and a sensor for sensing the laser beams deflected by the deflector on a main scanning line. The sensor is shared by the laser beams. The deflector is implemented as a plurality of polygonal mirrors coaxially stacked on each other and different in angular phases from each other.

BRIEF DESCRIPTION OF THE DRAWINGS

The above and other objects, features and advantages of the present invention will become more apparent from the following detailed description taken with the accompanying drawings in which:

FIGS. 2A and 2B are timing charts showing a relation between the output of a synchronization sensor included in the scanning device of FIG. 1 and time;

FIGS. 8A through 8D are timing charts each showing a particular relation between the output of a synchronization sensor and time.

DESCRIPTION OF THE PREFERRED EMBODIMENT

Figure 1:
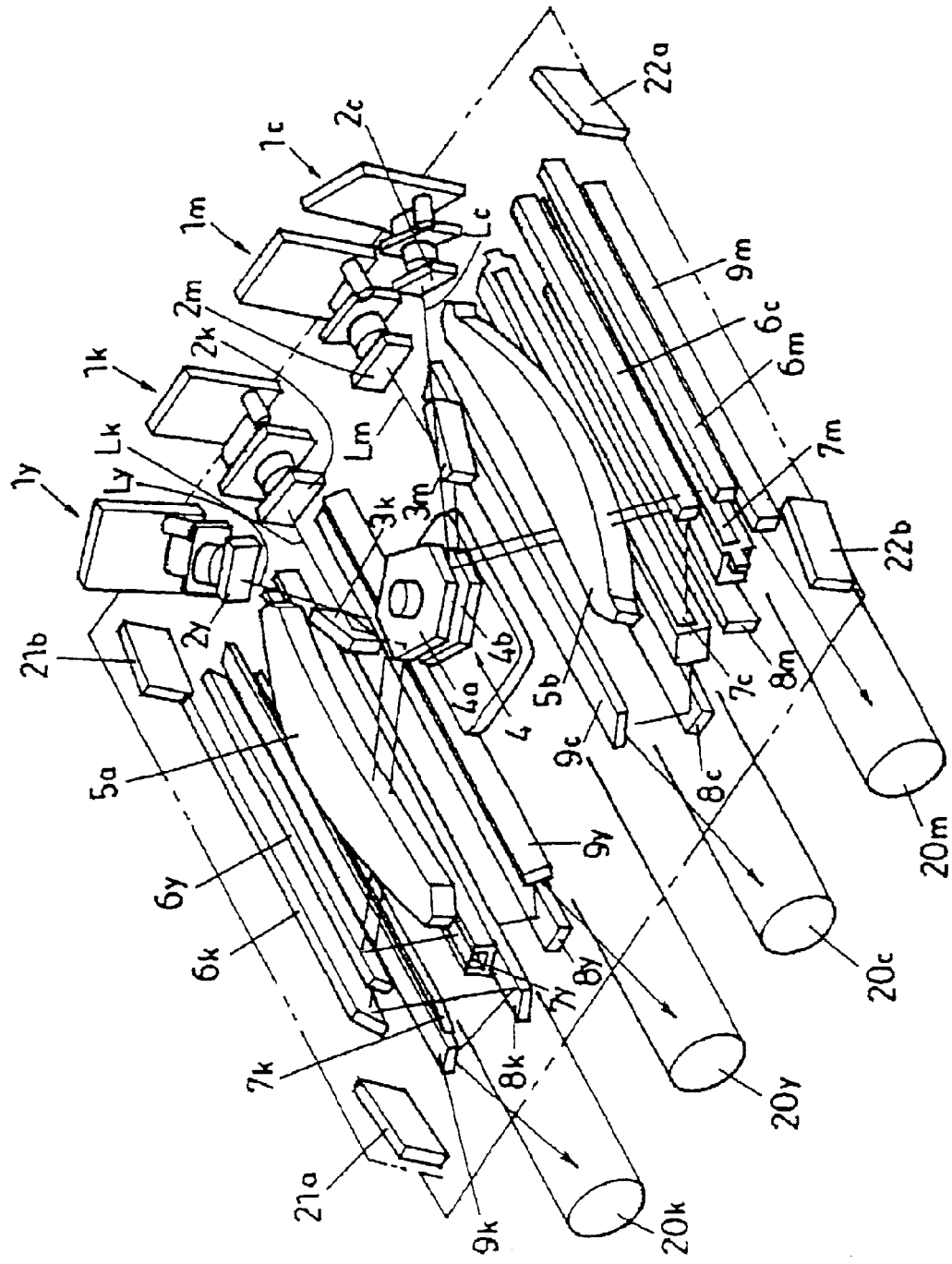
FIG. 1 is a perspective view showing a conventional optical scanning device.

To better understand the present invention, reference will be made to the conventional optical scanning device applicable to a tandem image forming apparatus and including a plurality of optics accommodated in a single housing, shown in FIG. 1. As shown, the optical scanning device is applied to a high-speed color laser printer including a yellow (Y), a black (BK), a magenta (M) and a cyan (C) color station. The scanning device includes four light source units 1y, 1k, 1m and 1c for emitting laser beams Ly, Lk, Lm and Lc, respectively. The laser beams Ly, Lk, Lm and Lc are transmitted through cylindrical lenses 2y, 2k, 2m and 2c, respectively. Subsequently, the laser beams Ly and Lc each directly form a line image elongate in the horizontal direction in the vicinity of a particular face of a polygonal mirror or deflecting means 4. The laser beams Lk and Lm output from the cylindrical lenses 2k and 2m, respectively, are reflected by mirrors 3k and 3m, respectively, and then each form a line image elongate in the horizontal direction in the vicinity of a particular face of the polygonal mirror 4.

The rotatable deflector 4 is made up of a first and a second polygonal mirror 4a and 4b coaxially spaced from each other by a preselected distance and having the same phase angle.

The upper polygonal mirror 4a and lower polygonal mirror 4b respectively deflect the laser beams Ly and Lc and the laser beams Lk and Lm such that each laser beam scans a particular surface to be scanned. The laser beams Ly and Lk and the laser beams Lm and Lc steered by the deflector 4 are transmitted through a first and a second fθ lens 5a and 5b, respectively. The laser beams Ly, Lk, Lm and Lc are then respectively reflected by first mirrors 6y, 6k, 6m and 6c toward troidal lenses 7y, 7k, 7m and 7c, respectively. The laser beams Ly through Lc output from the troidal lenses 7y through 7c are sequentially steered by second mirrors 8y, 8k, 8m and 8c and then by third mirrors 9y, 9k, 9m and 9c, respectively. Consequently, the laser beams Ly, Lk, Lm and Lc are respectively incident to the surfaces of photoconductive drums or image carriers 20y, 20k, 20m and 20c, which are the surfaces to be scanned, and scan them in the main scanning direction.

Two mirrors for synchronization, not shown, are positioned at opposite ends of a scanning range assigned to the laser beams Ly and Lk. Likewise, two mirrors for synchronization, not shown, are positioned at both sides of the scanning range of the laser beams Lm and Lc. Synchronization sensors 21a and 21b are so positioned as to receive the laser beams Ly and Lk reflected by the associated mirrors while synchronization sensors 22a and 22b are so positioned as to receive the laser beams Lm and Lc reflected by the associated mirrors. The synchronization sensors 21a through 22b constitute sensing means for outputting synchronizing signals.

As stated above, in the conventional scanning device, the laser beams Ly through Lc each are incident to a particular face of the upper polygonal mirror 4a or the lower polygonal mirror, so that the polygonal mirrors 4a and 4b each steer two of the incident laser beams. This, coupled with the fact that two of the laser beams share the sensors 21a and 21b or 22a and 22b, simplify the construction of the scanning device.

However, because the upper and lower polygonal mirrors 4a and 4b have the same angular phase, lights propagated through two optical paths are incident to a single sensor at the same time, making it difficult to produce synchronizing signals independent of each other. To solve this problem, in the scanning device of FIG. 1, the laser beams Ly and Lk or the laser beams Lm and Lc sharing the same sensors are distinguished from each other by being provided with slightly different synchronization image heights (e.g. by 4 mm). This kind of scheme, however, brings about the problem discussed earlier.

Figure 2B:
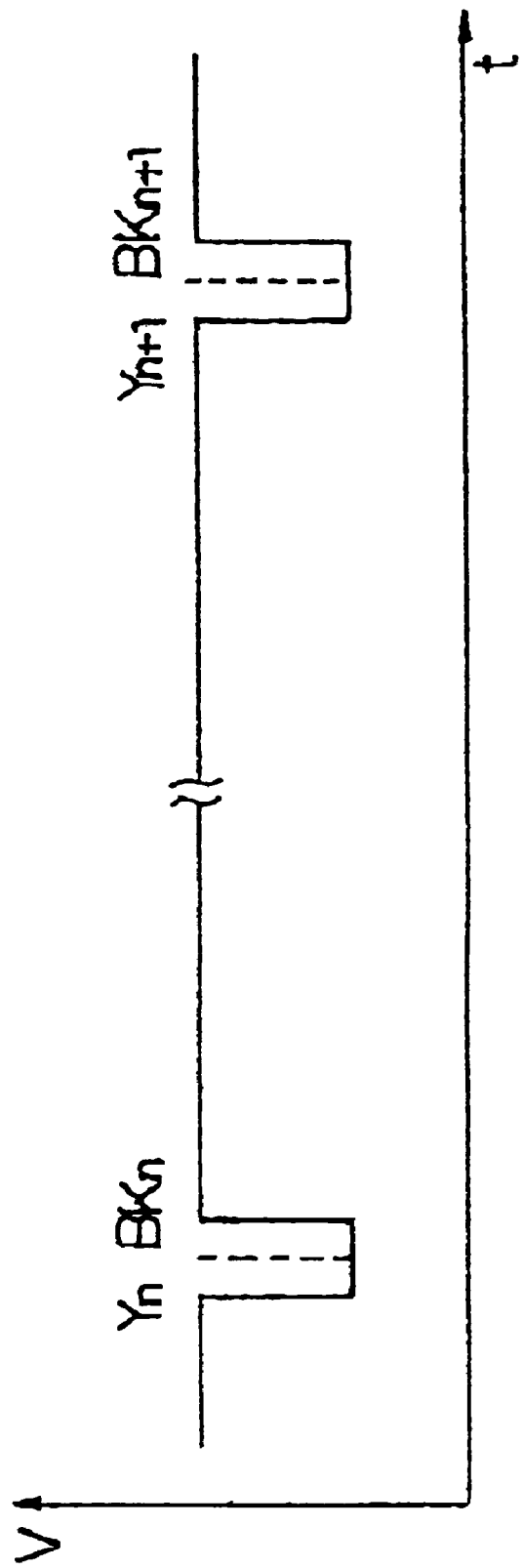

FIGS. 2A and 2B show a relation between the output V of the sensor 21a shared by the laser beams Ly and Lk and time t. More specifically, FIG. 2A shows a condition wherein the image heights of the laser beams Ly and Lk are clearly distinguishable from each other while FIG. 2B shows a condition wherein the image heights are close to each other. More specifically, while FIG. 2A shows a condition wherein the arrangement is accurate, many products put on the market are not accurately arranged, as shown in FIG. 2B. In FIGS. 2A and 2B, Yn and BKn respectively indicate sensor outputs (synchronizing signals) derived from the laser beams Ly and Lk on the "n" line.

In the condition shown in FIG. 2A, synchronizing signals Yn and Yn+1 are clearly separate from synchronizing signals BKn and BK+1, respectively, implementing desirable image formation. By contrast, in the condition shown in FIG. 2B, the signals Yn and BKn or the signals Yn+1 and BKn+1 overlap each other, obstructing desirable image formation.

Referring to FIGS. 3 through 6, an optical scanning device embodying the present invention is shown. As for the basic optical configuration, the illustrative embodiment is similar to the conventional scanning device shown in FIG. 1. The following description will therefore concentrate on differences between the illustrative embodiment and the conventional scanning device and arrangements not shown in FIG. 1.

Figure 6:
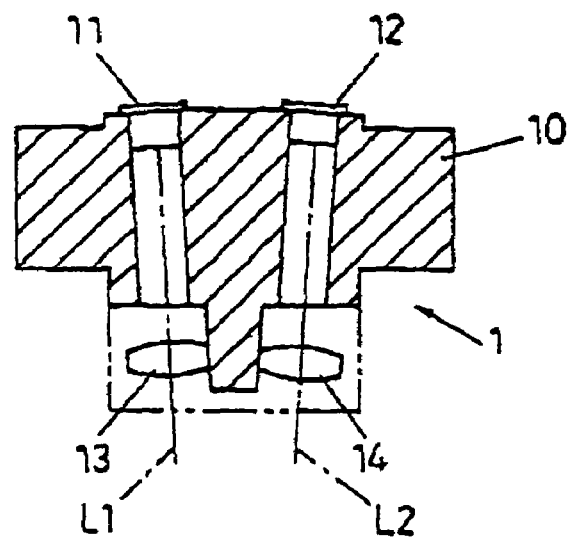
FIG. 6 is a section showing a light source unit included in the illustrative embodiment.

As shown in FIG. 6, in the illustrative embodiment, a light source unit 1 representative of any one of light source units 1y, 1k, 1m and 1c is implemented as a multibeam light source unit. More specifically, the light source unit 1 includes a single light source holder 10 holding a first and a second light source 11 and 12 each being implemented as a semiconductor laser and a first and a second coupling lens 13 and 14 for coupling the light sources 11 and 12, respectively. Adjusting means, not shown, provides a preselected opening angle between a first and a second laser beam L1 and L2 in the main scanning direction.

The light sources units 1Y through 1C with the configuration described above respectively scan photoconductive drums or image carriers 20y through 20c at a preselected interval, e.g., 8 mm each. Such an interval can be set with a minimum of error if the positions of the light sources 11 and 12 and those of the coupling lenses 13 and 14 are adjusted at the time of production of the light source unit. This makes it needless to rotate a rotatable deflector 4 for thereby reducing noise and extending the life of a motor assigned to the deflector 4.

In the illustrative embodiment, the deflector 4 is made up of an upper and a lower polygonal mirror 4a and 4b different in angular phase from each other by, e.g., 30°. This difference in angular phase successfully increases the interval between synchronizing signals even when synchronization image heights are the same.

Figure 7:
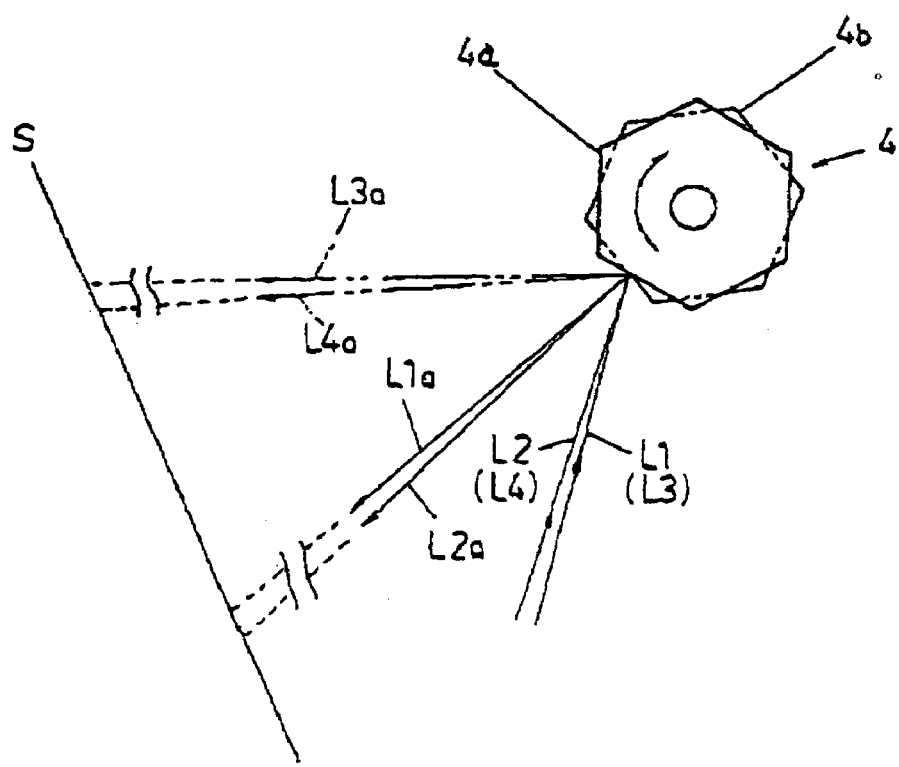
FIG. 7 shows optical paths extending from a deflector included in the illustrative embodiment.

More specifically, as shown in FIG. 7, laser beam L1 and L3 or laser beams L2 and L4 from the light sources emitted at the same time are respectively incident to the upper and lower polygonal mirrors 4a and 4b, respectively. The resulting laser beams L1a and L3a or laser beams L2a and L4a reflected by the polygonal mirrors 4a and 4b are incident to different image height positions on a surface S to be scanned. Therefore, synchronizing signals appear at a sufficient interval, which is the sum of the difference in image height and the difference in angular phase between the polygonal mirrors 4a and 4b.

It is noteworthy that the difference in angular phase between the two polygonal mirrors 4a and 4b does not have to be strictly controlled, but should only be greater than a preselected angle necessary for the separation of synchronizing signals. Such a difference therefore does not matter at all in the aspect of production. Further, to produce the polygonal mirrors 4a and 4b, a single work should only be ground with the angular phase difference mentioned above or two mirrors should only be press-fitted or shrinkage-fitted in a single shaft. Any one of such production methods may be selected in matching relation to production cost, required face accuracy and so forth.

The configuration and operation of the illustrative embodiment will be described in detail with reference to FIG. 5 by taking a yellow (Y) station as an example. As shown, the light source unit 1y is a multibeam light source having the two light sources 11 and 12, two semiconductor lasers and two collimator lenses, as stated earlier. Also, the rotatable deflector 4 has the upper and lower polygonal mirrors 4a and 4b shifted from each other by a preselected angular phase, e.g., 30°.

The laser beam Ly issuing from the light source unit 1y is transmitted through the cylindrical lens 2y and then sequentially deflected by a plurality of mirrors, not shown, forming a line image elongate in the main scanning direction in the vicinity of the deflecting face of the upper polygonal mirror 4a. The laser beam Ly incident to the polygonal mirror 4a is deflected thereby and then transmitted through the upper layer of the first fθ lens 5a, which has a lower layer in addition to the upper layer. The laser beam output from the upper layer is steered by the first turn-back mirror 6y, transmitted through the troidal lens 7y, again reflected by the second and third turn-back mirrors 8y and 9y, and then incident to the surface of the drum 20y via a dust-proof glass 15y.

Mirrors 16a and 16b for synchronization are positioned between the second and third turn-back mirrors 8y and 9y at the leading side and trailing side, respectively, in the scanning direction X. The laser beam Ly reflected by the mirror 16a at the leading side is incident to a photodiode, not shown included in the synchronization sensor 21a. Likewise, the laser beam reflected by the mirror 16b at the training side is incident to a photodiode, not shown, included in the synchronization sensor 21b. The synchronization sensor 21a is used to synchronize scanning lines while the synchronization sensor 21b is used to measure the scanning speed, i.e., the magnification of an image in combination with the synchronization sensor 21a.

Figure 5:
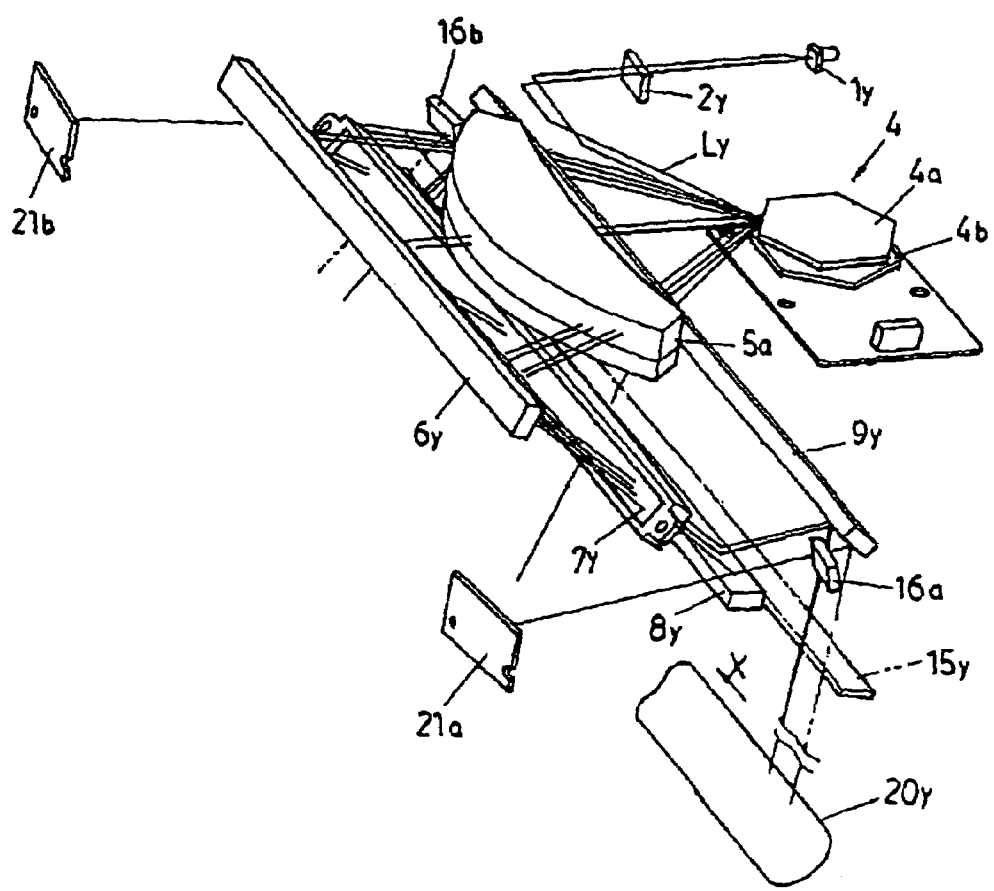
FIG. 5 is a perspective view showing one of different stations included in the illustrative embodiment together with optical paths.

The Y, M, C and BK stations each have the configuration shown in FIG. 5. Therefore, in FIGS. 3 and 4, the optical devices of the Y, M, C and BK stations are simply distinguished by suffixes y, m, c and k.

The Y and BK stations are located at the side shown in FIG. 5 with respect to the deflector 4 while the C and M stations are located at the opposite side. The mirror 17a and sensor 22a for synchronization and the mirror 17b and sensor 22b for synchronization are also arranged at the side opposite to the Y and BK stations at the leading edge side and trailing edge side, respectively, in the scanning direction Y. In this configuration, the Y station through BK station share the deflector 4. Also, the Y and BK stations share the mirrors 16a and 16b and sensors 21a and 21b while the C and M stations share the mirrors 17a and 17b and sensors 22a and 22b. This successfully simplifies the construction of the scanning device. Other suitable mirrors are arranged to guide the laser beams Ly, Lk, Lm and Lc reflected by the mirrors 16a, 16b, 17a and 17b, respectively, toward the sensors 21a, 21b, 22a and 22b, respectively, although not shown in FIG. 3 or 4 specifically.

Figure 3:
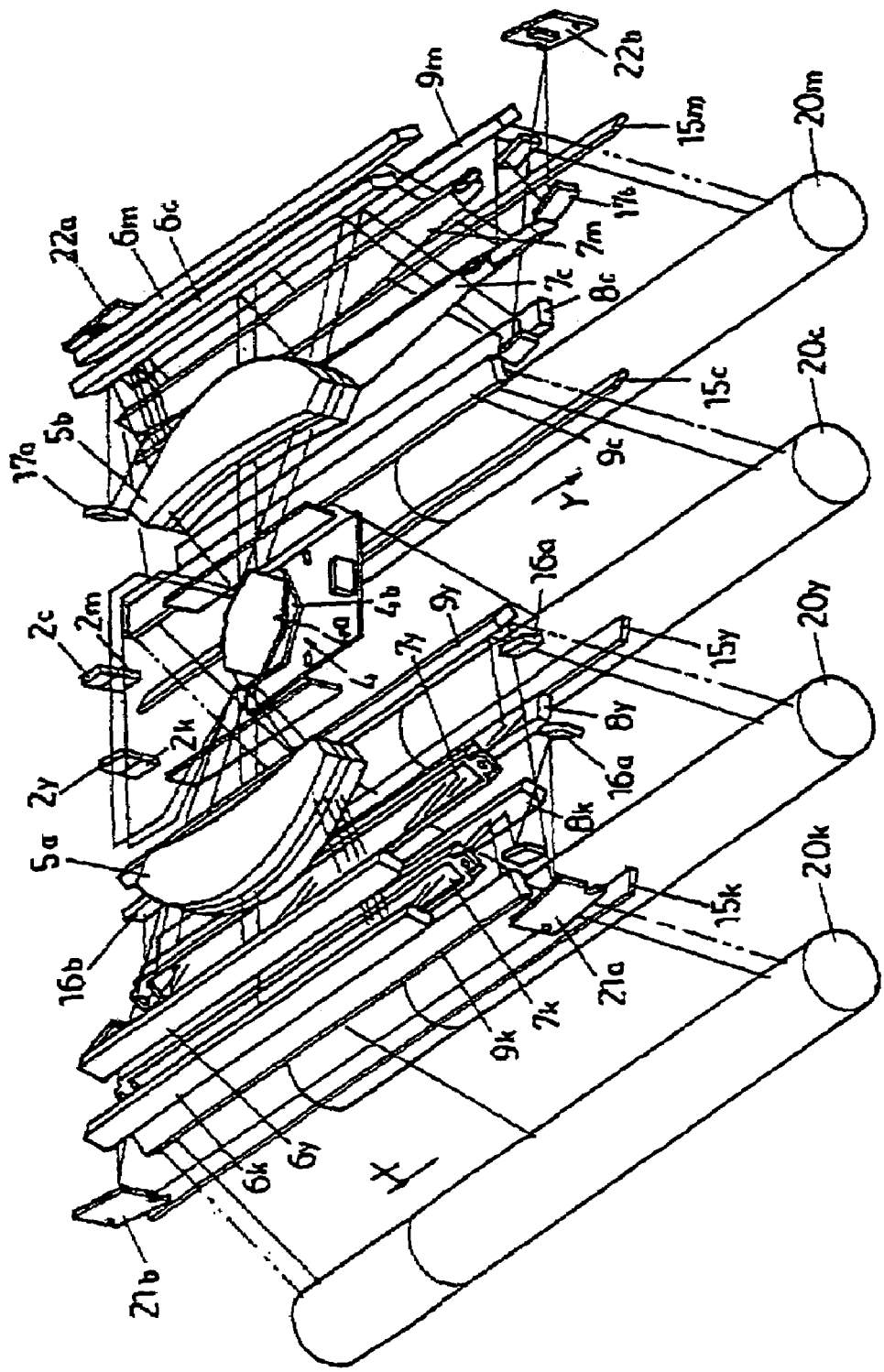
FIG. 3 is a perspective view showing an optical scanning device embodying the present invention.
Figure 4:
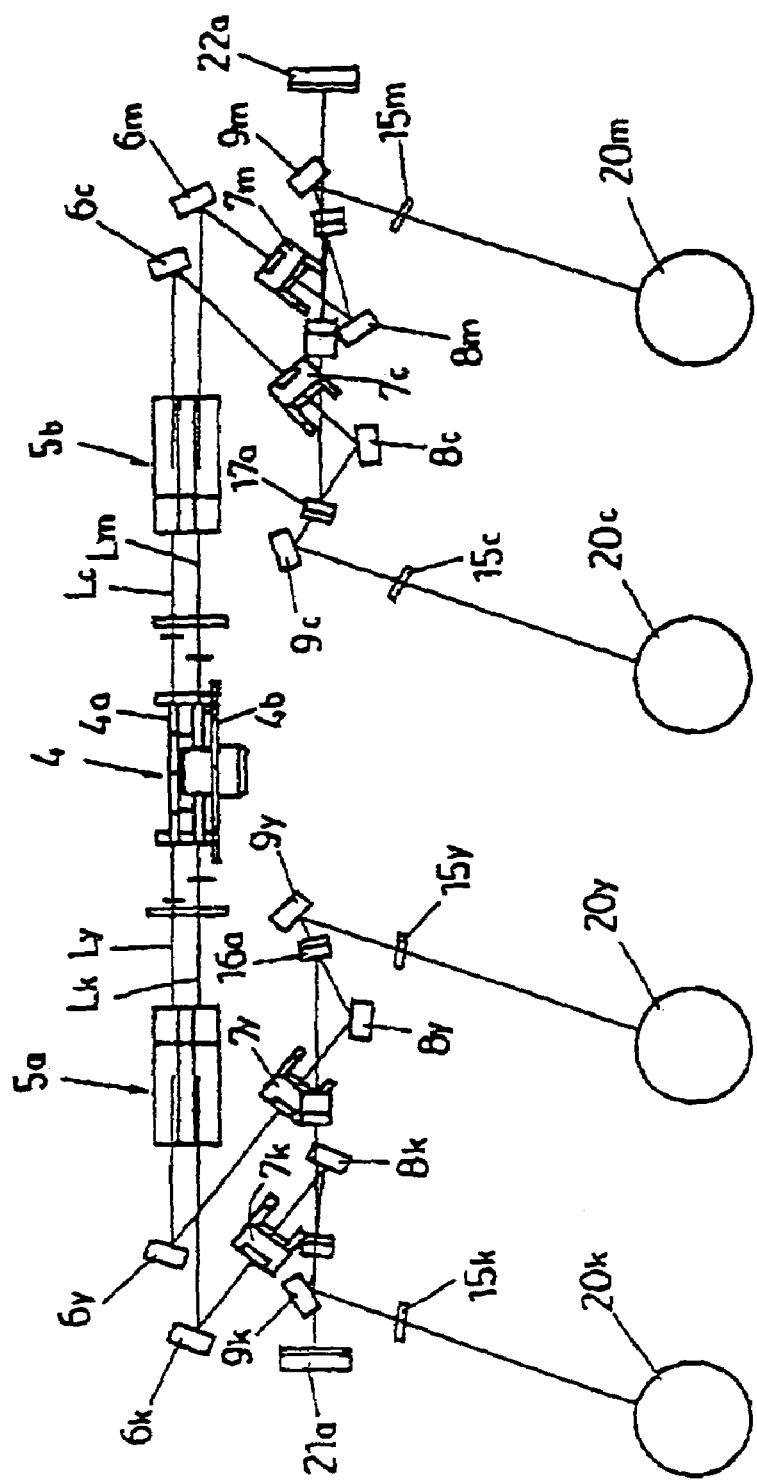
FIG. 4 is a side elevation showing the illustrative embodiment.

In FIGS. 3 and 5, among the laser beams incident to each of the drums 20y through 20c, the laser beams (solid lines) positioned just inward of the outermost laser beams (phantom lines) are representative of an effective image range, e.g., 297 mm. The outermost laser beams are, in practice, turned back halfway and do not reach the drum surface.

Figure 8A:
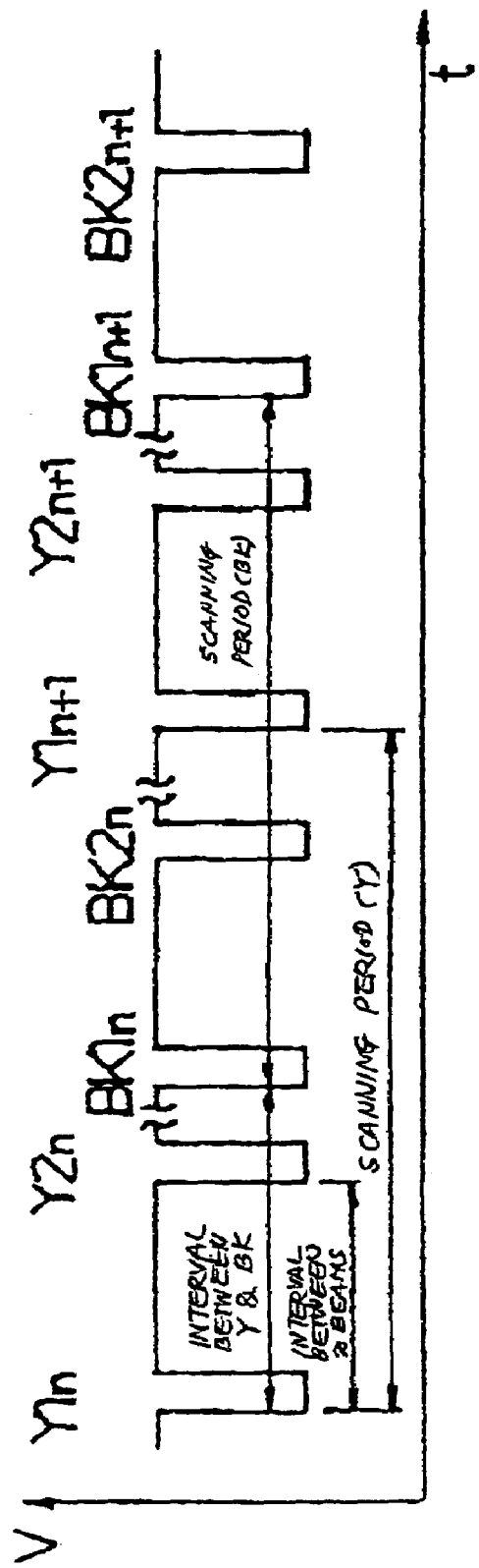
Figure 8B:
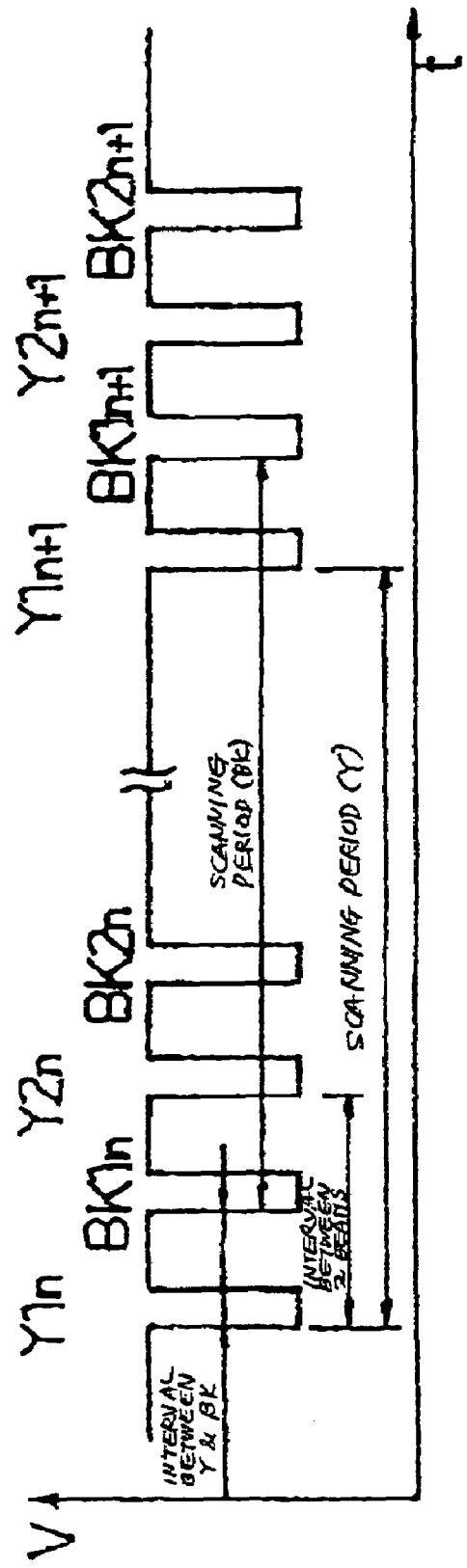
Figure 8C:
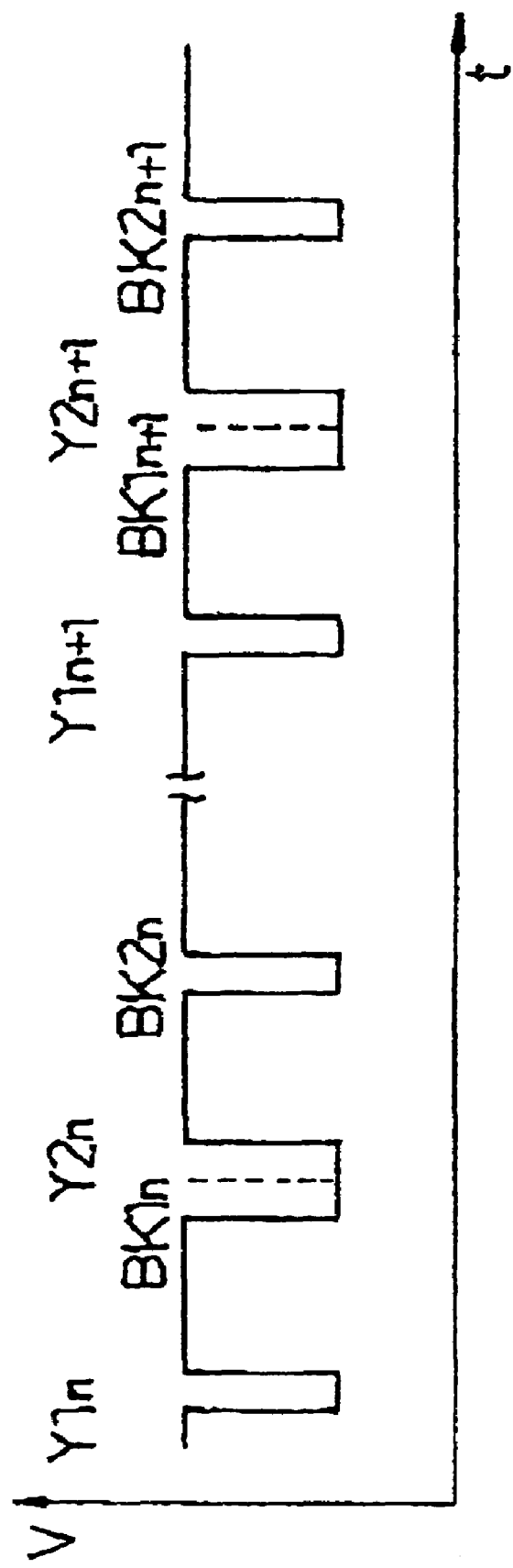

FIGS. 8A through 8D are timing charts each showing a particular relation between the sensor output V derived from the laser beams Ly and Lk, which share the same sensor for synchronization, and time t. Specifically, FIG. 8A shows a relation achievable with the illustrative embodiment while FIGS. 8B through 8D show relations occurring when the polygonal mirrors 4a and 4b are not different in angular phase from each other. In FIGS. 8A through 8D, Y1n and Y2n indicate output signals on the "n" line derived from the two light sources of the light source unit 1y while BK1n and BK2n indicate output signals on the "n" line derived from the two light sources of the light source unit 1k, which share the same sensor 21a with the light source unit 1y.

As shown in FIG. 8B, even when a difference in angular phase is not provided between the polygonal mirrors 4a and 4b, the output signals can be separated from each other on the basis of a difference in image height if the individual optical device is accurate in configuration and position. However, as shown in FIG. 8C or 8D, when the image heights of the laser beams Ly and Lk are remote from each other or close to each other, the output signals BK1n and Y2n or the output signals Y1n and BK1n and Y2n and BK2n, respectively, overlap each other, preventing synchronization from being detected. By contrast, as shown in FIG. 8A, the illustrative embodiment providing a difference in angular phase between the polygonal mirrors 4a and 4b noticeably increases the interval between the output signals Y1n and Y2n and the output signals BK1n and BK2n, making synchronization sensing extremely easy.

Figure 9:
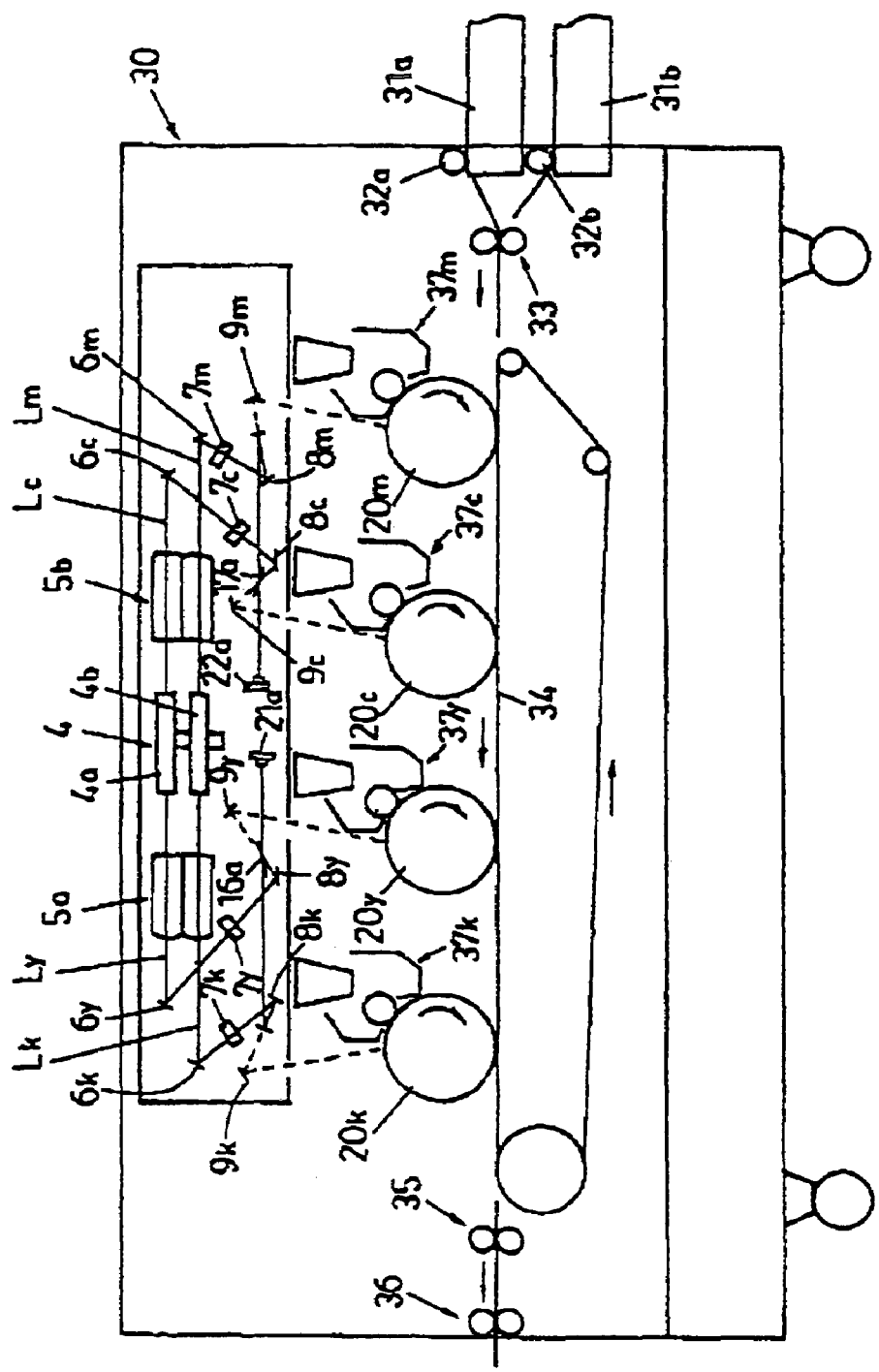
FIG. 9 shows a specific configuration of an image forming apparatus including the scanning device of FIG. 3.

FIG. 9 shows an image forming apparatus including the optical scanning device having the construction described above. As shown, the image forming apparatus is implemented as a laser printer including a housing 30 and two sheet cassettes 31a and 31b arranged one above the other each being loaded with a stack of sheets of a particular size. Pickup rollers 32a and 32b are respectively associated with the sheet cassettes 31a and 31b for paying out the sheets one by one. A feed roller pair 33 conveys the top sheet paid out from the sheet cassette 31a or 31b to a belt 34. The belt 34 conveys the sheet via consecutive image stations. A fixing roller pair 35 fixes an image transferred to the sheet. An outlet roller pair 36 drives the sheet carrying the sheet thereon, i.e., a print out of the printer.

The drums 20m, 20c, 20y and 20k are positioned on the belt 34 and spaced from each other in the direction in which the belt 34 conveys the sheet. The drums 20m through 20k each are rotated in a direction indicated by an arrow in FIG. 9. The optical scanning device is located above the drums 20m through 20k and extends in the direction in which the drums 20m through 20k are arranged. The laser beams Lm, Lc, Ly and Lk are emitted via four windows formed in the bottom of the casing included in the scanning device. The laser beams Lm through Lk respectively scan the charged surfaces of the drums 20m through 20k to thereby form latent images.

Developing units 37m, 37c, 37y and 37k are respectively positioned downstream of the positions on the drums 20m, 20c, 20y and 20k scanned by the laser beams Lm, Lc, Ly and Lk. The developing units 37m, 37c, 37y and 37k store magenta toner, cyan toner, yellow toner and black toner, respectively. The developing units 37m through 37k each include a unit case, a removable toner cartridge, and a developing roller.

Image transfer rollers are so arranged as to respectively face the drums 20m through 20k with the intermediary of the belt 34. A cleaning unit is positioned downstream of each image transfer roller. Such structural elements are conventional and not shown in FIG. 9.

The developing units 37m through 37k respectively develop the latent images formed on the drums 20m through 20k with toner stored therein, thereby producing corresponding toner images. The toner images of different colors are sequentially transferred to the sheet being conveyed by the belt 34 one above the other, completing a full-color image. After the full-color image has been fixed on the sheet by the fixing roller pair 35, the sheet or print is driven out of the printer by the outlet roller pair 36.

While the illustrative embodiment has concentrated on a laser printer, the present invention is, of course, applicable to any other image forming apparatus using a laser beam, e.g. a copier or a facsimile apparatus. While all the light source units of the illustrative embodiment have shown and described as being implemented as a multibeam light source. A plurality of light source units each including a single beam light source may be arranged. Even with this arrangement, it is possible to sufficiently separate the signals because the faces of the two polygonal mirrors are different in phase from each other. For example, the phase difference easily implements an interval that is one-half of the maximum scanning width and is 150 mm in an A3 machine. Of course, by adding a difference in image height between beams, it is possible to more clearly separated the signal. Further, a plurality of light source units may be implemented as the combination of a light source unit including a single beam light source and a light source unit including a plurality of beam light sources, if desired.

In summary, it will be seen that the present invention provides an optical scanning device and an image forming apparatus having various unprecedented advantages, as enumerated below.

(1) Stable separation of synchronization signals and therefore desirable image formation is achievable without increasing the length of optical devices. In addition, the scanning device is reduced in size and cost.

(2) Deflecting means does not have to be rotated at high speed and therefore achieves a long service life while reducing noise during rotation.

(3) The scanning device installed in the image forming device as writing means insures stable image formation without any increase in the size or the cost of the apparatus.

(4) The image forming apparatus with the scanning device is small size and low cost.

Various modifications will become possible for those skilled in the art after receiving the teachings of the present disclosure without departing from the scope thereof.

What is claimed is:

1. An optical scanning device comprising:
    a plurality of light sources configured to emit a laser beam each;
    deflecting means for deflecting laser beams issuing from said plurality of light sources in a main scanning direction; and
    sensing means for sensing the laser beams deflected by said deflecting means on a main scanning line;
    wherein said sensing means is shared by the laser beams, and
    one of said plurality of light sources expected to emit at least one of the laser beams sharing said sensing means comprises a plurality of light-emitting devices arranged to scan a desired surface at a preselected distance from each other in the main scanning direction,
    wherein said deflecting means comprises a plurality of polygonal mirror coaxially stacked on each other and different in angular phase from each other.

2. An image forming apparatus comprising:
    a plurality of image carriers;
    an optical scanning device comprising a plurality of light sources configured to emit a laser beam each, deflecting means for deflecting laser beams issuing from said plurality of light sources in a main scanning direction, and sensing means for sensing the laser beams deflected by said deflecting means on a main scanning line, wherein said sensing means is shared by the laser beams, and one of said plurality of light sources expected to emit at least one of the laser beams sharing said sensing means comprises a plurality of light-emitting devices arranged to scan a desired surface at a preselected distance from each other in the main scanning direction;
    latent image forming means for forming a particular latent image on each of said plurality of image carriers by scanning said image carrier with a particular laser beam; and
    a plurality of developing means each for developing the latent image formed on a particular one of said plurality of image carriers to thereby produce a corresponding toner image,
    wherein said deflecting means comprises a plurality of polygonal mirrors coaxially stacked on each other and different in angular phase from each other.

3. The device as claimed in claim 2, wherein said plurality of image carriers comprise a plurality of photoconductive elements each being scanned by a particular laser beam in order to form the latent image corresponding to a particular color,
    said plurality of developing means each develop the latent image formed on a particular image carrier with a developer of a particular color to thereby produce a toner image, and
    toner images formed on said plurality of image carriers are sequentially transferred to a single recording medium one above the other.

4. An optical scanning device comprising:
    a plurality of light source units configured to emit a respective laser beam each;
    deflecting means for deflecting laser beams issuing from said plurality of light source units in a main scanning direction, said deflecting means scanning a particular surface to be scanned; and
    sensing means for sensing the laser beams deflected by said deflecting means on a main scanning line;
    wherein said sensing means is shared by the laser beams,
    said deflecting means comprises a plurality of polygonal mirrors coaxially stacked on each other and different in angular phases from each other, and
    at least one of said plurality of light source units comprises a plurality of light-emitting devices arranged to scan a desired surface at a preselected distance from each other in the main scanning direction.

5. An image forming apparatus comprising:
    a plurality of image carriers;
    an optical scanning device comprising a plurality of light source units configured to emit a respective laser beam each, deflecting means for deflecting laser beams issuing from said plurality of light source units in a main scanning direction, and sensing means for sensing said laser beams deflected by said deflecting means on a main scanning line, wherein said sensing means is shared by said laser beams, and said deflecting means comprises a plurality of polygonal mirrors coaxially stacked on each other and different in angular phases from each other;

latent image forming means for forming a particular latent image on each of said plurality of image carriers by scanning said image carrier with a particular laser beam; and a plurality of developing means each for developing the latent image formed on a particular one of said plurality of image carriers to thereby produce a corresponding toner image.

6. The apparatus as claimed in claim 5, wherein at least one of said plurality of light source units comprises a plurality of light-emitting devices arranged to scan a desired surface at a preselected distance from each other in the main scanning direction.

7. The device as claimed in claim 5, wherein said plurality of image carriers comprise a plurality of photoconductive elements each being scanned by a particular laser beam in order to form the latent image corresponding to a particular color, said plurality of developing means each develop the latent image formed on a particular image carrier with a developer of a particular color to thereby produce a toner image, and toner images formed on said plurality of image carriers are sequentially transferred to a single recording medium one above the other.

* * * * *